US012463809B2

(12) United States Patent
Inohiza

(10) Patent No.: US 12,463,809 B2
(45) Date of Patent: Nov. 4, 2025

(54) COMMUNICATION APPARATUS, CONTROL METHOD, AND COMPUTER-READABLE STORAGE MEDIUM

(71) Applicant: CANON KABUSHIKI KAISHA, Tokyo (JP)

(72) Inventor: Hirohiko Inohiza, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 143 days.

(21) Appl. No.: 17/970,695

(22) Filed: Oct. 21, 2022

(65) Prior Publication Data
US 2023/0041366 A1 Feb. 9, 2023

Related U.S. Application Data

(63) Continuation of application No. PCT/JP2021/014202, filed on Apr. 1, 2021.

(30) Foreign Application Priority Data

May 11, 2020 (JP) ................................. 2020-083367

(51) Int. Cl.
H04L 9/32 (2006.01)
H04L 9/08 (2006.01)
H04W 76/10 (2018.01)
H04W 84/12 (2009.01)

(52) U.S. Cl.
CPC ............. H04L 9/32 (2013.01); H04L 9/0861 (2013.01); H04W 76/10 (2018.02); H04W 84/12 (2013.01)

(58) Field of Classification Search
CPC ....... H04L 9/32; H04L 9/0861; H04L 9/3271; H04W 76/10; H04W 84/12; H04W 12/041; H04W 12/0433; H04W 12/06; H04W 76/15
USPC ........................................................ 713/155
See application file for complete search history.

(56) References Cited

U.S. PATENT DOCUMENTS

| 8,811,320 | B2 | 8/2014 | Inohiza |
| 10,263,834 | B2 | 4/2019 | Inohiza |
| 11,496,962 | B2 | 11/2022 | Inohiza |
| 2009/0028101 | A1 | 1/2009 | Kakumaru |

(Continued)

FOREIGN PATENT DOCUMENTS

| CN | 105165111 A | 12/2015 |
| JP | 2012-531817 A | 12/2012 |

(Continued)

OTHER PUBLICATIONS

International Search Report issued by the Japan Patent Office on Jun. 22, 2021 in corresponding International Application No. PCT/JP2021/014202, with English translation.

(Continued)

Primary Examiner — Catherine Thiaw
Assistant Examiner — Nega Woldemariam
(74) Attorney, Agent, or Firm — Carter, DeLuca & Farrell LLP

(57) ABSTRACT

A communication apparatus establishes, in a case where a second radio link is established with a partner apparatus in communication in addition to an already established first radio link, the second radio link using information obtained by authentication processing executed at the time of establishing the first radio link.

9 Claims, 5 Drawing Sheets

(56) References Cited

U.S. PATENT DOCUMENTS

| | | | |
|---|---|---|---|
| 2010/0054179 A1 | 3/2010 | Meyer | |
| 2013/0283347 A1* | 10/2013 | Hui | H04L 67/12 |
| | | | 726/3 |
| 2013/0283360 A1* | 10/2013 | Hui | H04L 63/08 |
| | | | 726/6 |
| 2014/0323131 A1 | 10/2014 | Hoon | |
| 2015/0026453 A1* | 1/2015 | Liu | H04L 63/08 |
| | | | 713/151 |
| 2015/0381577 A1 | 12/2015 | Reitsma | |
| 2017/0265069 A1 | 9/2017 | Palanigounder | |
| 2020/0267541 A1* | 8/2020 | Huang | H04W 12/10 |
| 2021/0126947 A1* | 4/2021 | Wang | H04W 12/71 |
| 2021/0391941 A1 | 12/2021 | Inohiza | |
| 2022/0022033 A1* | 1/2022 | Ho | H04W 12/041 |
| 2022/0272689 A1 | 8/2022 | Inohiza | |
| 2023/0041366 A1* | 2/2023 | Inohiza | H04L 9/32 |
| 2023/0049552 A1* | 2/2023 | Chitrakar | H04W 12/033 |
| 2023/0308869 A1* | 9/2023 | Dong | H04W 76/15 |
| 2024/0089891 A1* | 3/2024 | Kneckt | H04W 48/14 |
| 2024/0090056 A1* | 3/2024 | Kneckt | H04W 84/12 |
| 2024/0236639 A1* | 7/2024 | Chu | H04W 76/15 |
| 2024/0259777 A1* | 8/2024 | Chu | H04W 8/12 |
| 2024/0259778 A1* | 8/2024 | Chu | H04W 76/15 |

FOREIGN PATENT DOCUMENTS

| | | |
|---|---|---|
| JP | 2016-514411 A | 5/2016 |
| JP | 2018-050133 A | 3/2018 |
| KR | 2015-0128746 A | 11/2015 |
| WO | 2006/098116 A1 | 9/2006 |
| WO | 2011/005567 A2 | 1/2011 |
| WO | 2014/134414 A2 | 9/2014 |

OTHER PUBLICATIONS

Extended European Search Report issued by the European Patent Office on Mar. 4, 2024 in corresponding EP Patent Application No. 21803157.3.

Huang, P-K et al., "Multi-link Security Consideration" IEEE Draft doc: IEEE 802.11-19/1822r2 (Nov. 2019) pp. 1-15, XP068165045.

Harkins, D. et al., "Post EAP Key Management (PEKM) Protocol" IEEE Draft Post-EAP Key Management (PEKM) Proposal (Dec. 2004) pp. 1-26, XP017689761.

Notice of Reasons for Refusal issued by the Japanese Patent Office on Feb. 10, 2025 in corresponding JP Patent Application No. 2024-054628, with English translation.

Korean Office Action issued in corresponding KR Patent Application No. 10-2022-7042088, dated Aug. 5, 2024, with English translation.

Korean Office Action issued in corresponding KR Patent Application No. 10-2022-7042088, dated Apr. 1, 2025, with English translation.

Chinese Office Action issued by the China National Intellectual Property Administration on Feb. 26, 2025 in corresponding CN Patent Application No. 202180033919.9, with English translation.

\* cited by examiner

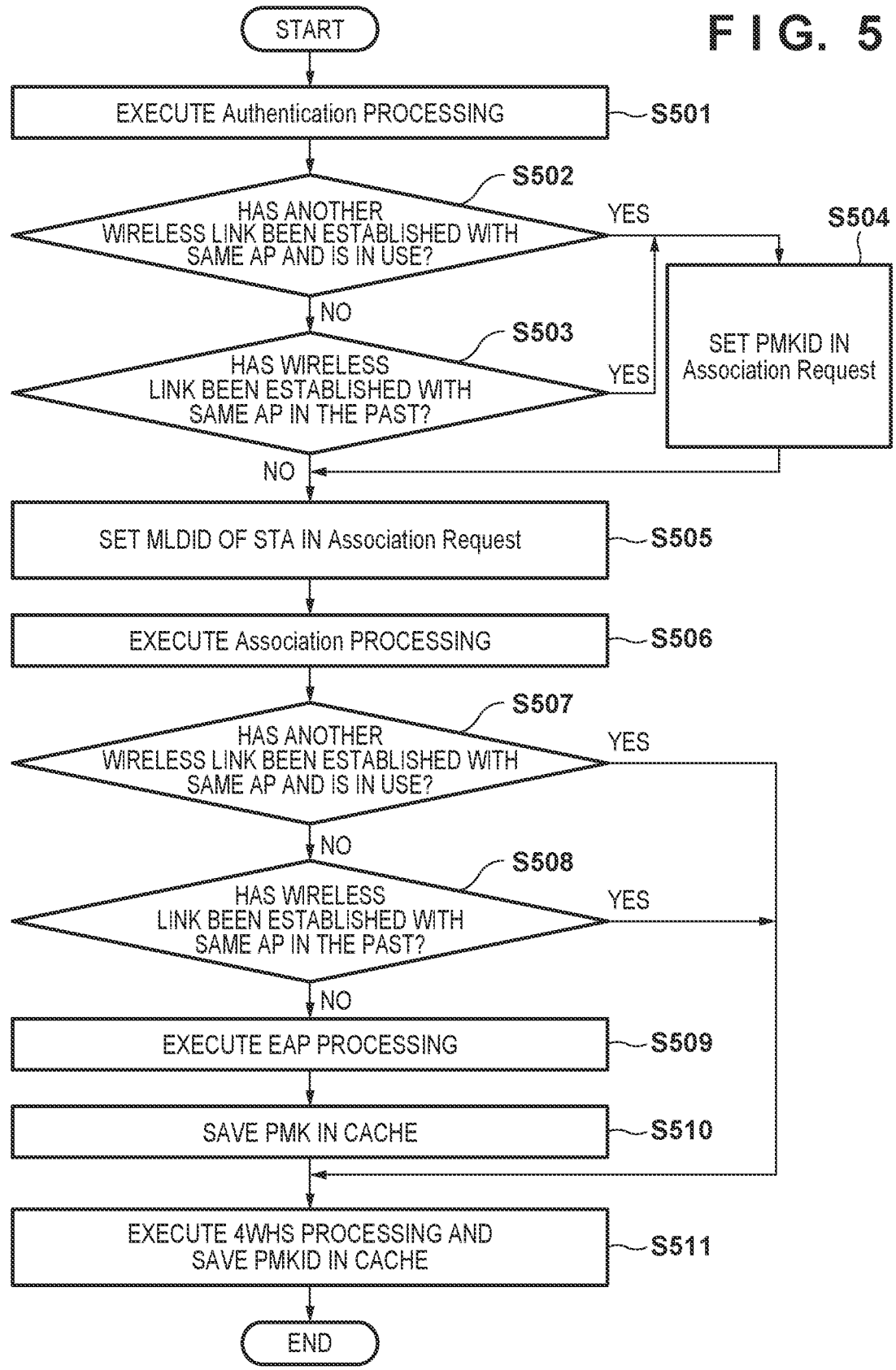

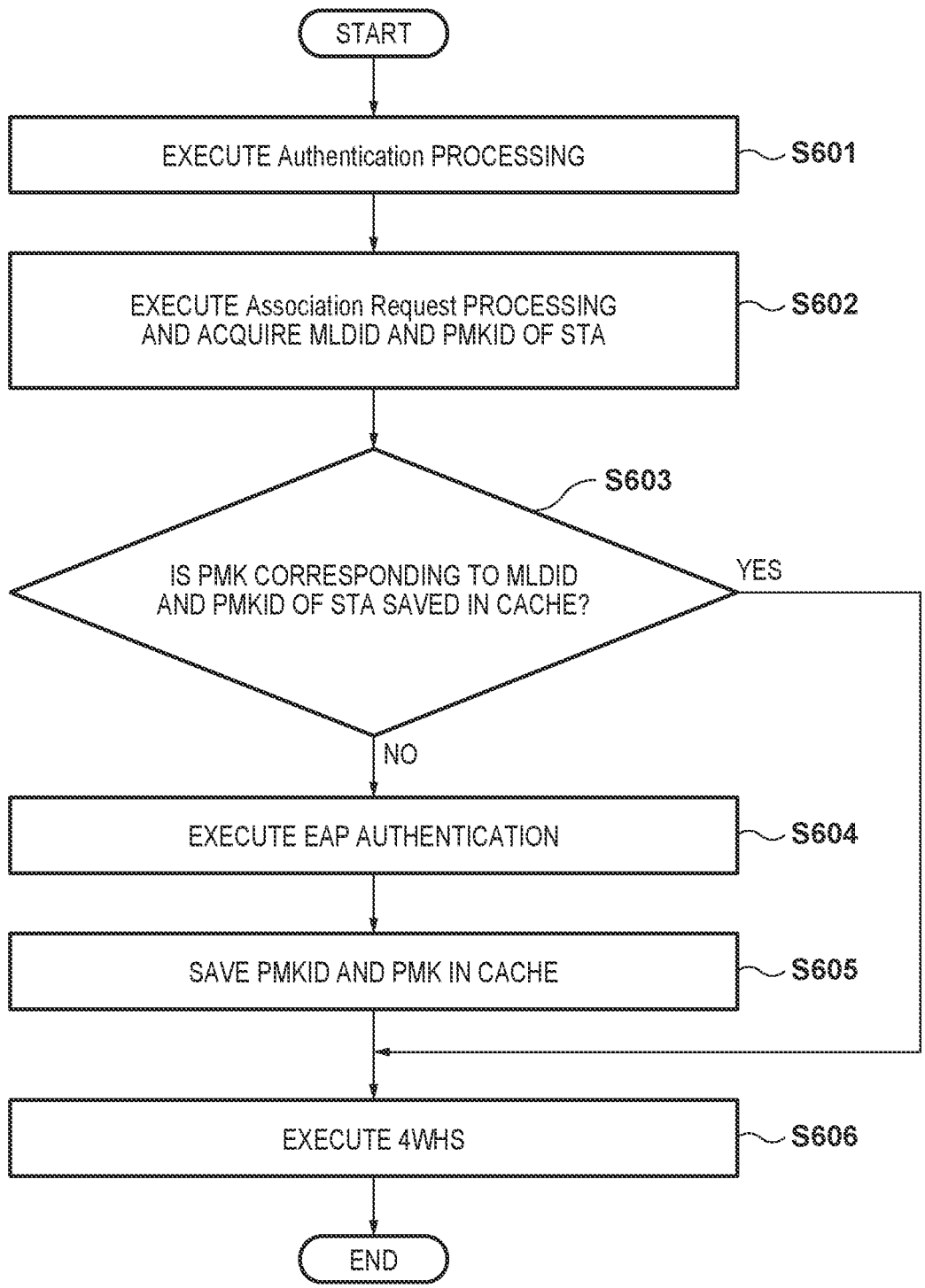

COMMUNICATION APPARATUS, CONTROL METHOD, AND COMPUTER-READABLE STORAGE MEDIUM

CROSS-REFERENCE TO RELATED APPLICATIONS

This application is a Continuation of International Patent Application No. PCT/JP2021/014202, filed Apr. 1, 2021, which claims the benefit of Japanese Patent Application No. 2020-083367 filed May 11, 2020, both of which are hereby incorporated by reference herein in their entirety.

BACKGROUND OF THE INVENTION

Field of the Invention

The present invention relates to a link establishment technique in wireless communication using a plurality of links.

Background Art

The IEEE802.11 standard series is known as a wireless LAN communication standard defined by IEEE (Institute of Electrical and Electronics Engineers). LAN is an acronym for Local Area Network. The IEEE802.11 standard series includes, for example, the IEEE802.11a/b/g/n/ac/ax standards. In the IEEE802.11ax standard among these standards, wireless communication by OFDMA (Orthogonal Frequency Division Multiple Access) is executed (see Japanese Patent Laid-Open No. 2018-050133). This allows a wireless communication apparatus complying with the IEEE802.11ax standard to perform communication with high peak throughput.

To further improve throughput or frequency use efficiency, the IEEE802.11be standard has been examined as a new standard of the IEEE802.11 series. For example, in the IEEE802.11be standard, adoption of multi-link communication in which one AP (Access Point) establishes a plurality of radio links with one STA (Station) via a plurality of different frequency channels to simultaneously perform wireless communications has been examined.

SUMMARY OF THE INVENTION

The present invention provides a technique for efficiently establishing a plurality of radio links in multi-link communication.

According to one aspect of the present invention, there is provided a communication apparatus capable of performing multi-link communication compliant with IEEE 802.11 standard series, comprising: a control unit configured to execute, in a case where the communication apparatus establishes a first radio link and a second radio link with another communication apparatus in order to perform the multi-link communication, generation processing for generating a Pairwise Master Key (PMK) that is an encryption key used for performing authentication with the other communication apparatus in a radio link in which Association processing is executed, but not to execute the generation processing in another link; and an establishment unit configured to establish the first radio link and the second radio link using the PMK generated in the generation processing.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 5 is a flowchart illustrating an example of the procedure of link establishment processing executed by an STA.

FIG. 6 is a flowchart illustrating an example of the procedure of link establishment processing executed by an AP.

DESCRIPTION OF THE EMBODIMENTS

Figure 1:
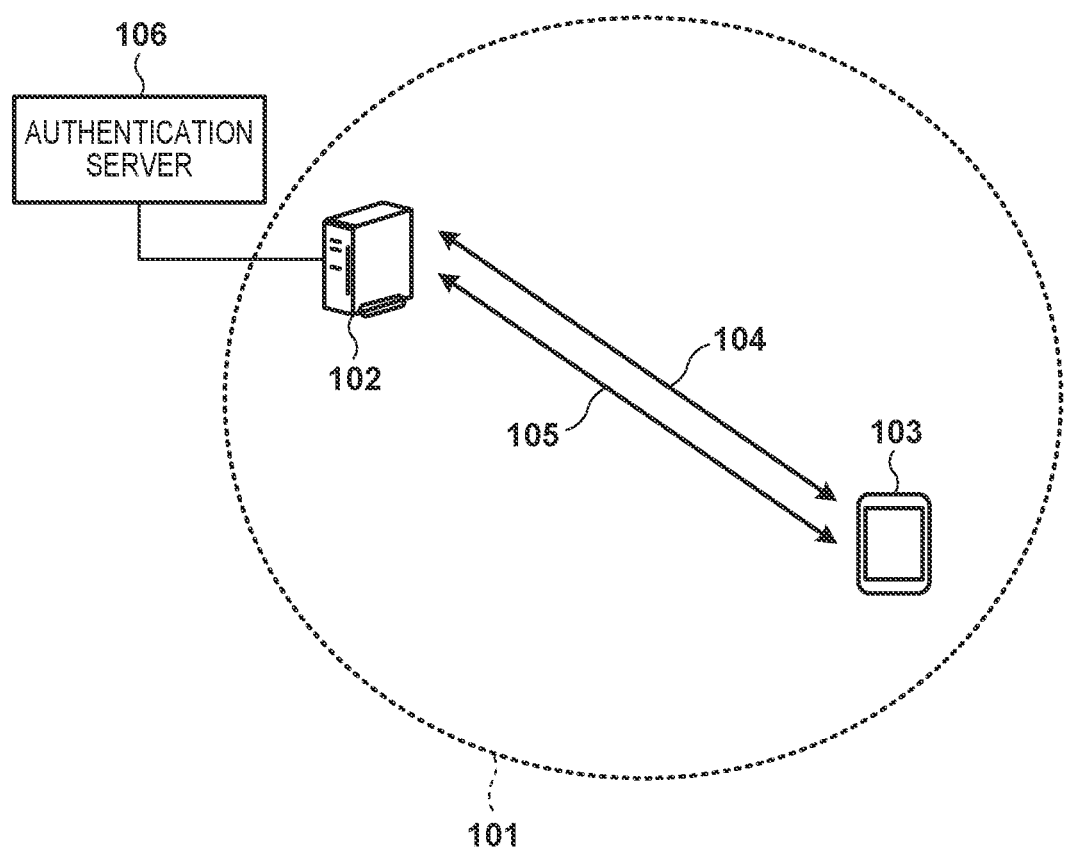
FIG. 1 is a view showing an example of a network configuration.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(Network Configuration)

FIG. 1 shows an example of the configuration of a wireless communication network according to this embodiment. The wireless communication network is, for example, a network 101 created by a communication apparatus 102, and the network 101 is, for example, a wireless LAN (Local Area Network). The communication apparatus 102 is configured to operate as an access point of the wireless LAN, which operates in a role of creating the network 101. Note that the access point will sometimes be referred to as the "AP" hereinafter. In this embodiment, when creating a plurality of networks, the communication apparatus 102 sets the same BSSID for all the networks. Note that BSSID is an acronym for Basic Service Set Identifier, and is an identifier for identifying a network. In addition, the communication apparatus 102 sets a common SSID as an SSID indicated in each network. SSID is an acronym for Service Set Identifier, and is an identifier for identifying an access point. That is, even in a case where the communication apparatus 102 according to this embodiment establishes a plurality of connections, one SSID is used. A communication apparatus 103 is a station having a role of joining the network 101. Note that the station will sometimes be referred to as the "STA" hereinafter.

Note that FIG. 1 shows only one AP but two or more APs can create networks, respectively. Furthermore, FIG. 1 shows only one STA but one or more STAs can join the network created by each of the one or more APs.

The communication apparatuses 102 and 103 support the IEEE802.11be (EHT) standard, and can execute wireless communication complying with the IEEE802.11be standard via the network 101. Note that IEEE is an acronym for Institute of Electrical and Electronics Engineers. EHT is an acronym for Extremely High Throughput. Note that EHT may be an acronym for Extreme High Throughput. The communication apparatuses 102 and 103 can perform communication in 2.4-, 5-, and 6-GHz frequency bands. Note that the frequency band used by the communication apparatuses 102 and 103 is not limited to them and, for example, a different frequency band such as 60-GHz band may be used. The communication apparatuses 102 and 103 can use 20-, 40-, 80-, 160-, and 320-MHz bandwidths for communication.

When a link between the AP and the STA is established, user authentication of the STA is performed, and a PMK (Pairwise Master Key) as a base key of a temporary encryption key to be used for encryption of communication between the STA and the AP is generated. In the IEEE802.11 standard series, as the user authentication method of an enterprise wireless LAN, EAP (Extensible Authentication Protocol) authentication by WPA-Enterprise is usable. In EAP authentication, an authentication server performs user authentication, and exchange of a number of EAP messages is required among the STA, the AP, and the authentication server. In this embodiment, an authentication server 106 is configured to execute EAP authentication at the time of establishing a link between the communication apparatuses 102 and 103. The authentication server 106 is connected to the communication apparatus 102 via, for example, a wired line or a wireless line. If EAP authentication by the authentication server 106 succeeds, a PMK as a base of a temporary key to be used for encryption of communication between the communication apparatuses 102 and 103 is generated by the communication apparatus 103 and the authentication server 106. Then, the authentication server 106 notifies the communication apparatus 102 of the generated PMK.

The communication apparatuses 102 and 103 can execute multi-user (MU) communication of multiplexing signals of a plurality of users by executing OFDMA communication complying with the IEEE802.11be standard. OFDMA is an acronym for Orthogonal Frequency Division Multiple Access. In OFDMA communication, frequency resource units (RUs) each having a predetermined frequency bandwidth obtained by dividing the full frequency band are prepared. Each of these frequency resource units includes a predetermined number of carrier waves, and the carrier waves are orthogonal to each other. The RUs not overlapping each other are allocated to one or more STAs. This allows the AP to simultaneously communicate with the plurality of STAs.

Furthermore, the communication apparatuses 102 and 103 are configured to execute multi-link communication in which links are established via a plurality of frequency channels to execute communication. Note that the frequency channels in this example indicate frequency channels which are defined in the IEEE802.11 standard series and in which wireless communication complying with the IEEE802.11 standard series can be executed. In the IEEE802.11 standard series, 2.4-, 5-, and 6-GHz bands are prepared as usable frequency bands, in each of which a plurality of frequency channels are defined. In the IEEE802.11 standard series, the bandwidth of each frequency channel is defined as 20 MHz. Note that a bandwidth of 40 MHz or more can be used in one frequency channel by bonding adjacent frequency channels.

For example, the communication apparatuses 102 and 103 can establish a first radio link 104 using the first frequency channel and a second radio link 105 using the second frequency channel therebetween, and communicate with each other via both the links. In this case, the communication apparatus 102 maintains the first radio link 104 using the first frequency channel while maintaining the second radio link 105 using the second frequency channel. When the communication apparatus 102 establishes, with the communication apparatus 103, a plurality of radio links using a plurality of frequency channels, as described above, it is possible to improve throughput in communication with the communication apparatus 103. Note that in multi-link communication, the communication apparatuses 102 and 103 may establish a plurality of radio links of different frequency bands or a plurality of radio links of the same frequency band. For example, the communication apparatuses 102 and 103 may establish the first radio link 104 in the 2.4-GHz band and the second radio link 105 in the 5-GHz band and communicate with each other. The communication apparatuses 102 and 103 may establish the third radio link in the 6-GHz band in addition to the first radio link 104 and the second radio link 105. Alternatively, the communication apparatuses 102 and 103 may establish the first radio link 104 using channel 1 in the 2.4-GHz band and the second radio link 105 using channel 5 in the 2.4-GHz band. Note that the communication apparatuses 102 and 103 may use, in combination, a plurality of radio links of the same frequency band and a radio link of a different frequency band. For example, the communication apparatuses 102 and 103 may establish the third radio link using channel 36 in the 5-GHz band in addition to the first radio link 104 using channel 1 in the 2.4-GHz band and the second radio link 105 using channel 5 in the 2.4-GHz band. When the communication apparatus 102 establishes, with the communication apparatus 103, a plurality of connections of different frequency bands, even in a case where a given frequency band is congested, the communication apparatus 102 can communicate with the communication apparatus 103 using another frequency band. Therefore, when the communication apparatuses 102 and 103 establish a plurality of radio links in a plurality of frequency bands therebetween to communicate with each other, it is possible to prevent degradation of throughput in communication with the communication apparatus 103.

In multi-link communication, the plurality of radio links established by the communication apparatuses 102 and 103 are set to use at least different frequency channels. Note that in multi-link communication, the channel spacing between the frequency channels of the plurality of radio links established by the communication apparatuses 102 and 103 is set to at least 20 MHz or more. Note that the communication apparatuses 102 and 103 establish the first radio link 104 and the second radio link 105 in the above-described example but three or more radio links may be established.

When performing multi-link communication, each of the communication apparatuses 102 and 103 can transmit, to the partner apparatus via a plurality of radio links, a plurality of data or data obtained by dividing one data. Each of the communication apparatuses 102 and 103 may transmit the same data via each of the plurality of radio links. Thus, communication via one link can be executed as backup communication for communication via the other link. For example, assume that the communication apparatus 102 transmits, to the communication apparatus 103, the same data via the first radio link using the first frequency channel and the second radio link using the second frequency channel and an error occurs in communication via the first radio link. In this case, since the same data is transmitted via the second radio link, the communication apparatus 103 can receive the data, transmitted from the communication apparatus 102, not via the first radio link but via the second radio link.

The communication apparatuses 102 and 103 may use each radio link in accordance with the kind of frame or data to be communicated. When, for example, transmitting data concerning a captured image, the communication apparatus 102 can transmit meta information such as the date, parameters (aperture value and shutter speed) at the time of image capturing, and position information via the first radio link and transmit pixel information via the second radio link. The communication apparatus 102 may transmit a management frame via the first radio link, and transmit a data frame including data via the second radio link. Note that the management frame includes, for example, a Beacon frame, Probe Request/Response frames, and Association Request/Response frames. In addition, the management frame may include a Disassociation frame, an Authentication frame, a De-Authentication frame, and an Action frame. The Beacon frame is a frame that makes a notification of network information. The Probe Request frame is a frame that requests network information, and the Probe Response frame is a response to the Probe Request frame and is a frame that provides the network information. The Association Request frame is a frame that requests connection, and the Association Response frame is a response to the Association Request frame and is a frame that indicates permission of connection or an error. The Disassociation frame is a frame used to disconnect the connection. The Authentication frame is a frame used to authenticate the partner apparatus. The De-Authentication frame is a frame used to interrupt authentication of the partner apparatus and execute disconnection of the connection. The Action frame is a frame used to execute an additional function other than the above-described ones. The communication apparatuses 102 and 103 are configured to transmit/receive the management frames, such as the above-described frames, complying with the IEEE802.11 standard series.

The communication apparatuses 102 and 103 may be configured to execute MIMO (Multiple-Input and Multiple-Output) communication. In this case, each of the communication apparatuses 102 and 103 includes a plurality of antennas, and one of the communication apparatuses uses the same frequency channel to transmit, from the respective antennas, different signals generated from a plurality of streams. The reception-side communication apparatus simultaneously receives, using the plurality of antennas, all the signals arriving from the plurality of streams, separates the signals of the streams, and decodes them. As compared with a case in which no MIMO communication is executed, the communication apparatuses 102 and 103 can communicate more data at the same time by executing MIMO communication. Furthermore, when performing multi-link communication, the communication apparatuses 102 and 103 may execute MIMO communication in some or all of the links.

Note that each of the communication apparatuses 102 and 103 supports the IEEE802.11be standard in the above-described example. In addition to this, each of the communication apparatuses 102 and 103 may support at least one of the legacy standards as standards defined before the IEEE802.11be standard. The legacy standards include the IEEE802.11a/b/g/n/ac/ax standards. Note that in this embodiment, the "IEEE802.11 standard series" indicates at least one of the IEEE802.11a/b/g/n/ac/ax/be standards. Each of the communication apparatuses 102 and 103 may support another communication standard such as Bluetooth®, NFC, UWB, Zigbee®, and MBOA in addition to the IEEE802.11 standard series. Note that UWB is an acronym for Ultra Wide Band, and MBOA is an acronym for Multi Band OFDM Alliance. Note that OFDM is an acronym for Orthogonal Frequency Division Multiplexing. Furthermore, NFC is an acronym for Near Field Communication. UWB includes wireless USB, wireless 1394, and Winet. In addition, each of the communication apparatuses 102 and 103 may support communication standards of wired communication such as a wired LAN.

The communication apparatus 102 can be, for example, a wireless LAN router, a PC (Personal Computer), or the like. However, the communication apparatus 102 is not limited to them, and can be an arbitrary communication apparatus that can execute multi-link communication with another communication apparatus. The communication apparatus 103 can be, for example, a camera, a tablet, a smartphone, a PC, a mobile phone, a video camera, or the like. However, the communication apparatus 103 is not limited to them, and can be an arbitrary communication apparatus that can execute multi-link communication with another communication apparatus. Note that the components and functions described with respect to the communication apparatuses 102 and 103 in this embodiment may be executed by an information processing apparatus such as a radio chip that can execute wireless communication complying with the IEEE802.11be standard. Note also that the information processing apparatus such as a radio chip can include an antenna for transmitting a generated signal.

As described above, the communication apparatuses 102 and 103 execute multi-link communication. At this time, in multi-link communication, in a case where EAP authentication is executed every time a link is established, the overhead of exchange of EAP messages is large, and it take time to establish connection. Therefore, in consideration of the above problem, the communication apparatuses 102 and 103 of this embodiment execute processing for efficiently establishing a plurality of links. Examples of the arrangement of the communication apparatuses 102 and 103 and a processing procedure executed by these communication apparatuses will be described below.

(Arrangement of Communication Apparatus)

Figure 2:
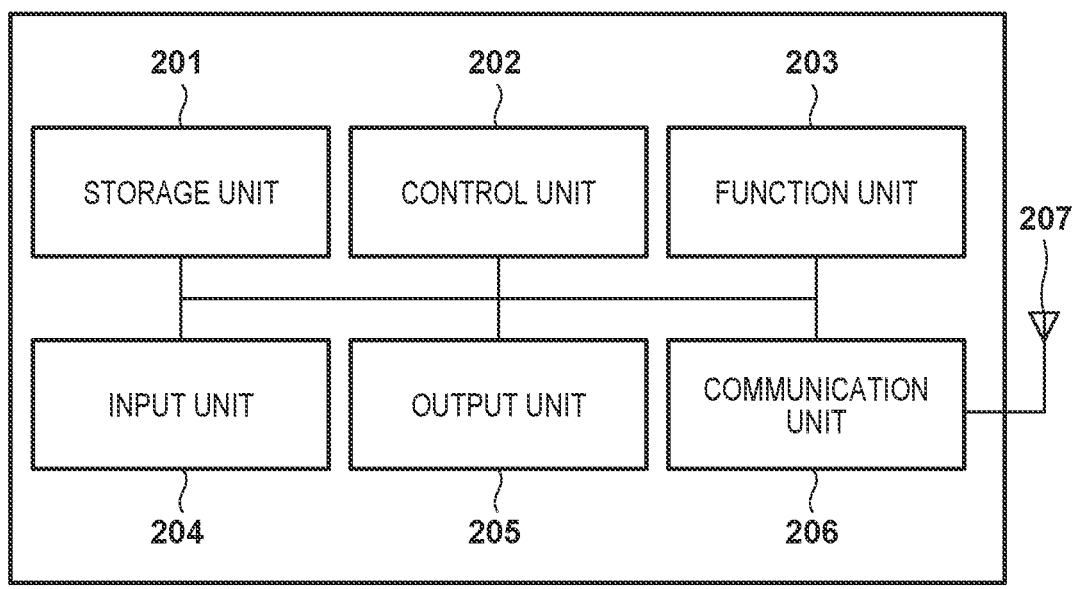
FIG. 2 is a block diagram showing an example of the hardware arrangement of a communication apparatus.

FIG. 2 shows the hardware arrangement of the communication apparatus 102 according to this embodiment. The communication apparatus 102 includes a storage unit 201, a control unit 202, a function unit 203, an input unit 204, an output unit 205, a communication unit 206, and an antenna 207. Note that the arrangement shown in FIG. 2 schematically shows at least some of the functions of the communication apparatus 102, and the communication apparatus 102 can include other components, as a matter of course. The communication apparatus 103 has the same hardware arrangement as that of the communication apparatus 102 and a description thereof will be omitted.

The storage unit 201 is formed by one or more memories such as a ROM and a RAM, and stores computer programs for performing various operations (to be described later), and various kinds of information such as communication parameters for wireless communication. ROM is an acronym for Read Only Memory and RAM is an acronym for Random Access Memory. In addition to the memory such as a ROM or a RAM, the storage unit 201 may include a storage medium such as a flexible disk, a hard disk, an optical disk, a magneto-optical disk, a CD-ROM, a CD-R, a magnetic tape, a nonvolatile memory card, or a DVD. The storage unit 201 may include a plurality of memories.

The control unit 202 is formed by one or more processers such as a CPU and an MPU, and controls the whole communication apparatus 102 by executing computer programs stored in the storage unit 201. Note that the control unit 202 may be configured to control the whole communication apparatus 102 by cooperation of an OS (Operating System) and the computer programs stored in the storage unit 201. The control unit 202 generates data or a signal (radio frame) to be transmitted in communication with another communication apparatus. Note that CPU is an acronym for Central Processing Unit, and MPU is an acronym for Micro Processing Unit. The control unit 202 may include a plurality of processors such as a multi-core processor, and control the whole communication apparatus 102 by the plurality of processors. In addition, the control unit 202 controls the function unit 203 to execute wireless communication or predetermined processing such as image capturing, printing, or projection processing. The function unit 203 is, for example, hardware used by the communication apparatus 102 to execute predetermined processing.

The input unit 204 accepts various kinds of operations from the user. The output unit 205 performs various kinds of outputs to the user via a monitor screen or a loudspeaker. In this example, the output by the output unit 205 may include, for example, display of a visual output (for example, a screen on the monitor screen), audio output by a loudspeaker, and vibration output. Note that both the input unit 204 and the output unit 205 may be implemented by one module, like a touch panel. Furthermore, each of the input unit 204 and the output unit 205 may be integrated with the communication apparatus 102, or may be detachable from the communication apparatus 102.

The communication unit 206 controls wireless communication complying with the IEEE802.11be standard. The communication unit 206 may control wireless communication complying with another standard included in the IEEE802.11 standard series in addition to the IEEE802.11be standard, or control wired communication by a wired LAN or the like. The communication unit 206 controls the antenna 207 to transmit/receive signals for wireless communication generated by the control unit 202. Note that in a case where the communication apparatus 102 supports the NFC standard or Bluetooth standard in addition to the IEEE802.11 be standard, the communication unit 206 may control wireless communication complying with these communication standards. Note also that in a case where the communication apparatus 102 can execute wireless communication complying with each of a plurality of communication standards, it may include the communication unit 206 and the antenna 207 supporting each communication standard. The communication apparatus 102 transmits/receives data such as image data, document data, or video data to/from the communication apparatus 103 via the communication unit 206.

The antennas 207 is an antenna that allows communication in the 2.4-, 5-, and 6-GHz bands. The communication apparatus 102 includes one antenna in this embodiment but may include antennas different for the respective frequency bands. In a case where the communication apparatus 102 includes a plurality of antennas, it may include a plurality of communication units 206 respectively corresponding to the antennas. Note that the antenna 207 may be configured as a module integrated with the communication unit 206 or may be prepared separately from the communication unit 206.

Figure 3:
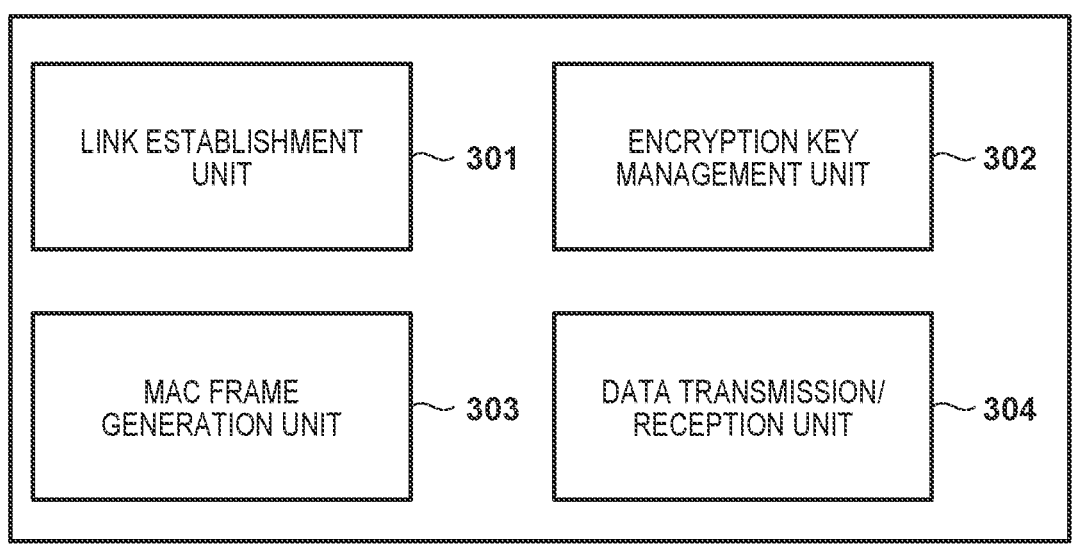
FIG. 3 is a block diagram showing an example of the functional arrangement of the communication apparatus.

FIG. 3 shows an example of the functional arrangement of the communication apparatus 102 according to this embodiment. For example, the communication apparatus 102 includes, as the functional arrangement, a link establishment unit 301, an encryption key management unit 302, a MAC frame generation unit 303, and a data transmission/reception unit 304. Note that the arrangement shown in FIG. 3 schematically shows functions associated with this embodiment, and the communication apparatus 102 can include the general functions of the communication apparatus 102 and other functions corresponding to the application purposes of the communication apparatus 102, as a matter of course. The communication apparatus 103 has the same functional arrangement as that of the communication apparatus 102 and a description thereof will be omitted.

The link establishment unit 301 performs processing for establishing one or more radio links to be used by the communication apparatus 102 to execute data communication with the communication apparatus 103. The link establishment processing includes, for example, authentication processing, association processing, EAP authentication processing, and 4-Way-Hand-Shake (4WHS) processing. If EAP authentication succeeds, a PMK as a base of a temporary key to be used for encryption of communication between the communication apparatuses 102 and 103 is generated by the communication apparatus 103 and the authentication server 106, and the authentication server 106 notifies the communication apparatus 102 of the generated PMK. The PMK is used to generate a temporary encryption key in the 4WHS processing. The link establishment unit 301 may execute, in advance, connection processing of a plurality of radio links at the time of performing connection to the communication apparatus 103, or may execute, later, connection processing of another radio link during communication using a predetermined radio link.

The encryption key management unit 302 manages the PMK obtained by the link establishment unit 301, and an encryption key such as a temporary key, for example, a PTK or GTK generated in the 4WHS processing. The encryption key management unit 302 also manages a PMKID that associates the PMK and the ID of the partner apparatus with each other. The PMKID is identification information corresponding to the PMK. This management enables the encryption key management unit 302 to specify the corresponding PMK by specifying the ID of the partner apparatus and the PMKID. The MAC frame generation unit 303 generates various management frames such as the Association Request/Response frames, and a MAC frame included in a data frame or the like. The data transmission/reception unit 304 transmits a radio frame including the MAC frame generated by the MAC frame generation unit 303, and receives a radio frame from the partner apparatus.

(Processing Procedure)

Figure 4:
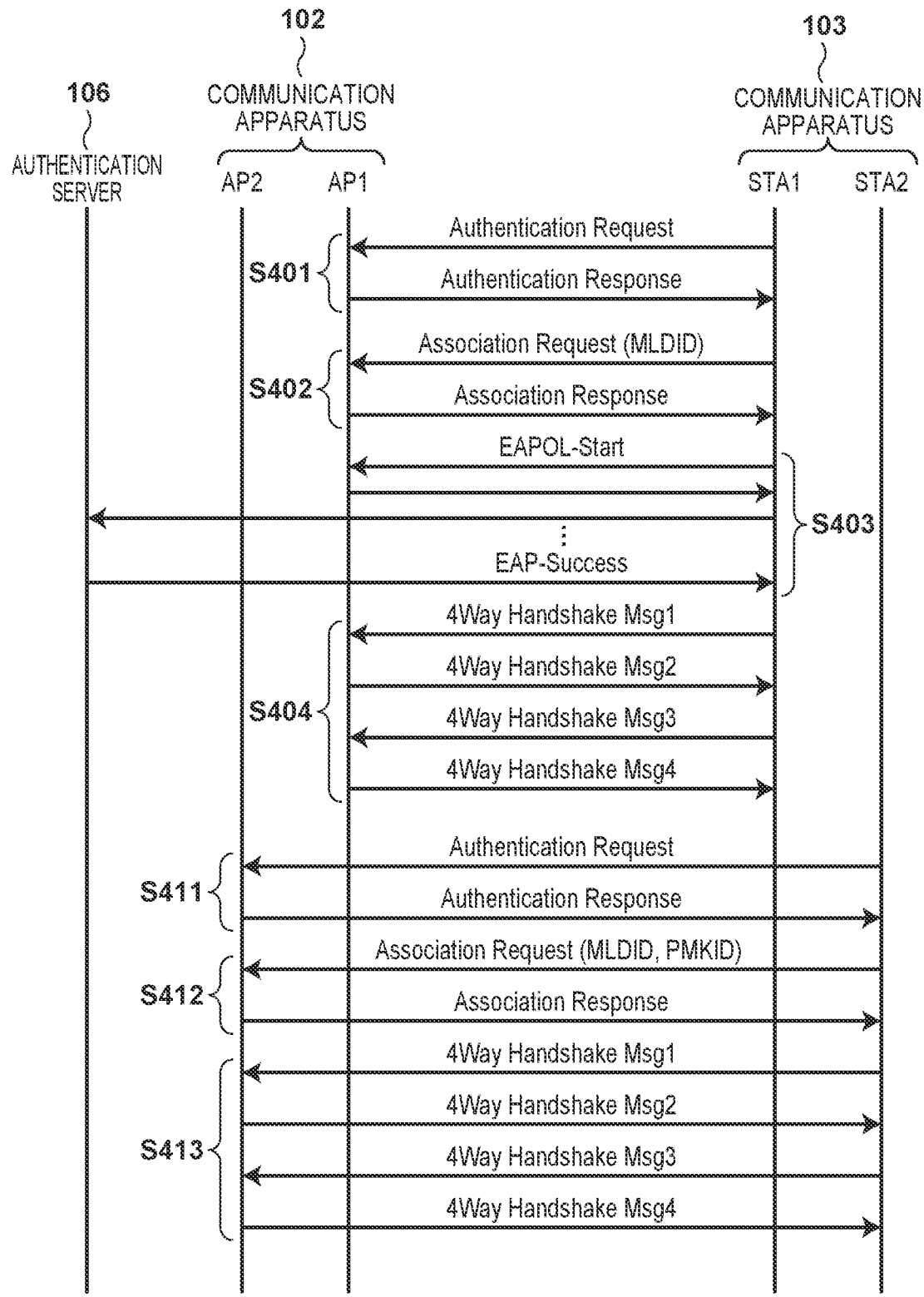
FIG. 4 is a sequence chart for explaining an example of the procedure of multi-link establishment processing.

Subsequently, an example of a processing procedure executed by the communication apparatuses 102 and 103 will be described. FIG. 4 shows examples of messages transmitted/received by the communication apparatuses 102 and 103. In this example, a case in which two radio links are used will be exemplified. Communication processing using the first frequency channel (for example, channel 1 in the 2.4-GHz band) is performed in the first radio link, and communication processing using the second frequency channel (for example, channel 36 in the 5-GHz band) is performed in the second radio link. Note that in FIG. 4, for the sake of convenience, in the communication apparatus 102, the function of performing communication in the first radio link using the first frequency channel is represented by AP 1, and the function of performing communication in the second radio link using the second frequency channel is represented by AP 2. Similarly, in the communication apparatus 103, the function of performing communication in the first radio link using the first frequency channel is represented by STA 1, and the function of performing communication in the second radio link using the second frequency channel is represented by STA 2. Each of the communication apparatuses 102 and 103 may be configured to simultaneously execute communications using two or more frequency channels by physically different communication circuits or the like. Each of the communication apparatuses 102 and 103 may logically implement a plurality of AP functions or a plurality of STA functions using a common communication circuit or the like. The communication apparatuses 102 and 103 may simultaneously establish a plurality of radio links using the functions of one AP and one STA physically and logically, thereby communicating with each other.

This processing is started when, for example, each of the communication apparatuses 102 and 103 is powered on. When a user or an application instructs to start multi-link communication in at least one of the communication apparatuses 102 and 103, this processing may be started. When the data amount of data to be communicated with the partner apparatus becomes equal to or more than a predetermined amount in at least one of the communication apparatuses 102 and 103, this processing may be started. Note that FIG. 4 shows only some processes associated with this embodiment but various kinds of processes (for example, search request/response processes and the like) in a general wireless LAN connection method are executed, as a matter of course.

The communication apparatuses 102 and 103 execute authentication processing of the first radio link in the first frequency channel (S401). For example, the communication apparatus 103 transmits an Authentication Request frame for authentication to the communication apparatus 102, and the communication apparatus 102 transmits, to the communication apparatus 103, an Authentication Response frame as a response to the Authentication Request frame. Note that the SAE (Simultaneous Authentication Equal) method may be used for the authentication method. In this case, the Authentication Request frame and the Authentication Response frame are exchanged a plurality of times. After that, the communication apparatuses 102 and 103 execute association processing of the first radio link (S402). For example, the communication apparatus 103 transmits an Association Request frame for connection to the communication apparatus 102, and the communication apparatus 102 transmits, to the communication apparatus 103, an Association Response frame as a response to the Association Request frame. At this time, the communication apparatus 103 stores an MLDID (Multi-Link Device ID) as identification information of the communication apparatus 103 in the Association Request frame and transmits the Association Request frame.

Subsequently, EAP frames such as an EAPOL-Strat frame are exchanged among the communication apparatuses 102 and 103 and the authentication server 106, thereby executing EAP authentication (S403). If the EAP authentication is complete, a PMK common to the communication apparatuses 102 and 103 is held. Then, the communication apparatuses 102 and 103 execute the 4WHS processing to generate a temporary key of encryption communication (S404). As a result of the processing, the communication apparatuses 102 and 103 set, in a radio chip, a generated PTK as an encryption key to be used for unicast communication and a generated GTK as an encryption key to be used for multicast/broadcast communication. Each of the communication apparatuses 102 and 103 saves, in a cache, a PMKID associated with the ID of the partner apparatus and the PMK.

After that, the communication apparatuses 102 and 103 perform processing of establishing the second radio link. The processing of establishing the second radio link may be executed immediately after the processing of establishing the first radio link, or executed after a certain time elapses since establishment of the first radio link. In the processing of establishing the second radio link, first, the communication apparatuses 102 and 103 execute authentication processing of the second radio link in the second frequency channel (S411). For example, the communication apparatus 103 transmits an Authentication Request frame for authentication to the communication apparatus 102, and the communication apparatus 102 transmits, to the communication apparatus 103, an Authentication Response frame as a response to the Authentication Request frame. Note that in a case where the SAE method is used for the authentication method, the Authentication Request frame and the Authentication Response frame are exchanged a plurality of times. Then, the communication apparatuses 102 and 103 execute association processing of the second radio link (S412). For example, the communication apparatus 103 transmits an Association Request frame for connection to the communication apparatus 102, and the communication apparatus 102 transmits, to the communication apparatus 103, an Association Response frame as a response to the Association Request frame. At this time, the communication apparatus 103 stores the MLDID of the self apparatus and the PMKID associated with the communication apparatus 102 in the Association Request frame and transmits the Association Request frame. Upon receiving the Association Request frame, the communication apparatus 102 obtains the PMK corresponding to the MLDID and the PMKID from the cache. In this example, the PMK is held in the cache of the communication apparatus 102 by the processes in S403 and S404. Therefore, the communication apparatus 103 does not start EAP authentication and the communication apparatus 102 starts the 4WHS processing (S413). Note that the processing in S413 is the same as that in S404.

Subsequently, the link establishment processing executed by the STA (communication apparatus 103) will be described with reference to FIG. 5. Note that the processing shown in FIG. 5 can be implemented when, for example, the control unit 202 of the STA executes the program stored in the storage unit 201. The present invention, however, is not limited to this. For example, the processing shown in FIG. 5 may be implemented by dedicated hardware such as a wireless communication chip configured to execute the processing shown in FIG. 5. Alternatively, the processing shown in FIG. 5 may be implemented when, for example, the processor in the communication unit 206 of the STA executes a dedicated program.

First, the STA executes authentication processing with the AP (communication apparatus 102) (step S501). Then, the STA determines whether another radio link has been established with the same AP and is in use (step S502). In a case where the other radio link has not been established with the same AP or is not in use (NO in step S502), the STA determines whether a radio link has been established with the AP in the past (step S503). Then, in a case where there is the radio link, in use, with the AP as the execution partner of the authentication processing (YES in step S502) or the radio link has been established in the past (YES in step S503), the STA advances the process to step S504. On the other hand, if the STA determines that no radio link has been established in the past with the AP as the execution partner of the authentication processing (NO in step S503), the STA advances the process to step S505 without executing the processing in step S504. Note that the determination processes in steps S502 and S503 correspond to determination of whether the PMK corresponding to the AP has been cached, and for example, the processing of determining whether the radio link has actually been established in the past need not be performed. That is, past PMK information may be deleted after a given period of time, and the AP whose corresponding PMK information has been deleted can be regarded as an AP with which "no radio link has been established in the past".

Note that the STA executes the processing in step S503 not only when executing multi-link communication but also when executing single-link communication. That is, when the radio link is disconnected while communication is performed by establishing a single link, and the link is established again, the STA executes the determination processing in step S503. In this case, since the radio link disconnected from the AP of the connection destination has been established in the past, the process advances to step S504.

In step S504, the STA has the radio link established with the AP or has established the radio link with the AP in the past, the PMK corresponding to the AP is cached. Therefore, the STA stores the PMKID in the Association Request frame. The PMKID is used to designate the PMK cached in the AP of the communication partner. In step S505, the STA stores, in the Association Request frame, the MLDID for identifying the self apparatus. After that, the STA uses the set Association Request frame to execute the Association processing (step S506).

Subsequently, similar to steps S502 and S503, the STA determines whether there is a radio link, in use, with the AP for which the Authentication processing has been executed (step S507), and determines whether the radio link has been established in the past (step S508). In a case where there is a radio link, in use, with the AP (YES in step S507) or the radio link has been established in the past (YES in step S508), the STA advances the process to step S511 without executing processes in steps S509 and S510. In a case where the STA has no radio link, in use, with the AP and has not established the radio link with the AP in the past (NO in steps S507 and S508), no PMK is cached. Therefore, the STA executes EAP authentication to generate a PMK (step S509), and saves the generated PMK in the cache (step S510). In step S511, the STA executes the 4WHS processing with the AP of the connection establishment partner, and saves, in the cache, the PMKID notified from the AP.

Note that in this processing example, the example in which the PMKID and the MLDID are stored in the Association Request frame and transmitted to the AP has been explained. The present invention, however, is not limited to this. The PMKID and the MLDID may be stored in another frame such as the Authentication Request frame and transmitted to the AP.

Subsequently, an example of the procedure of the link establishment processing executed by the AP (communication apparatus 102) will be described with reference to FIG. 6. Note that the processing shown in FIG. 6 can be implemented when, for example, the control unit 202 of the AP executes the program stored in the storage unit 201. The present invention, however, is not limited to this. For example, the processing shown in FIG. 6 may be implemented by dedicated hardware such as a wireless communication chip configured to execute the processing shown in FIG. 6. Alternatively, the processing shown in FIG. 6 may be implemented when the processor in the communication unit 206 of the AP executes a dedicated program.

First, the AP executes authentication processing with the STA (communication apparatus 103) (step S601). Next, the AP executes association processing to obtain the PMKID and the MLDID for identifying the STA from the Association Request frame received from the STA of the connection partner. The AP confirms whether the PMK corresponding to the PMKID and the MLDID of the STA is saved in the cache (step S603). In a case where the PMK corresponding to the PMKID and the MLDID of the STA is not saved in the cache (NO in step S603), the AP waits until EAP authentication is executed between the STA and the authentication server 106 (step S604). Then, the AP obtains, from the authentication server 106, a PMK obtained by EAP authentication, and saves, in the cache, the PMKID corresponding to the obtained PMK and the MLDID of the STA (step S605). On the other hand, in a case where the PMK corresponding to the PMKID and the MLDID of the STA is saved in the cache (YES in step S603), the AP executes no processes in steps S604 and S605. After that, the AP executes 4WHS processing with the STA, and notifies the STA of the PMKID (step S606).

As described above, when the communication apparatuses 102 and 103 establish the second radio link in a state in which the first radio link is established, EAP authentication with respect to the second radio link is omitted. This can prevent EAP authentication from being executed every time a radio link is established, and also prevent the time taken for connection from being prolonged due to the overhead of exchange of EAP messages. This can efficiently establish, between the AP and the STA, a plurality of radio links complying with the IEEE802.11 standard series.

Note that the above-described embodiment is merely an example, and various modifications can be made. For example, multi-link communication complying with the IEEE802.11 standard series has been explained but the above-described processing is also applicable to multi-link communication complying with another wireless communication standard. Furthermore, the above-described embodiment has explained the example in which information obtained by EAP authentication is used for another radio link but the same discussion is also applicable to predetermined authentication processing including authentication processing other than EAP authentication. Note that the predetermined authentication processing may be authentication processing performed via an external apparatus, such as the authentication server 106, different from the communication apparatuses 102 and 103 or may be authentication processing performed without intervention of an external apparatus.

According to the present invention, it is possible to efficiently establish a plurality of radio links in multi-link communication.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus capable of performing wireless communication compliant with IEEE 802.11 standard series, comprising:
   at least one memory that stores a set of instructions; and
   at least one processing circuit;
   wherein the communication apparatus is caused, by the at least processing circuit executing the instructions and/or the at least processing circuit itself operating, to perform operations comprising:
      executing association processing in a first radio link in order to establish the first radio link and a second radio link with another communication apparatus;
      obtaining a Pairwise Master Key (PMK) by executing authentication processing using Extensible Authentication Protocol (EAP) with the other communication apparatus in the first radio link in which the association processing is executed and with an external authentication server which is different from the communication apparatus and the other communication apparatus, but not executing the authentication processing using the EAP in the second radio link;
      obtaining a temporary key generated based on the PMK, by executing a 4-way handshake (4WHS) processing with the other communication apparatus in the first radio link, wherein the temporary key is an encryption key to be used for unicast communication;
      executing, via the second radio link, unicast communication using the temporary key;
      performing management of the obtained PMK as a cache data, wherein, in the management, a PMK identifier (ID) and Multi Link Device identifier (MLD ID) are managed in relation to the obtained PMK as the cache data; and
   in a case where the communication apparatus manages the PMK corresponding to the other communication apparatus, transmitting, in the association processing, an association frame including the PMK ID to the other communication apparatus, notifying, in the association processing, the other communication apparatus of the PMK ID and the MLD ID information by including the PMK ID and the MLD ID in an association request.

2. The communication apparatus according to claim 1, wherein in a case where the communication apparatus manages the PMK corresponding to the other communication device, the communication apparatus omits retry of the authentication processing with the external authentication server.

3. The communication apparatus according to claim 1, wherein the communication apparatus is a station of a wireless LAN complying with an IEEE802.11 standard series, and the other communication apparatus is an access point of the wireless LAN,
   wherein in the authentication processing, the external authentication server performs user authentication based on the EAP message transmitted by the communication apparatus.

4. The communication apparatus according to claim 1, wherein the communication apparatus is an access point of a wireless LAN complying with an IEEE802.11 standard series, and the other communication apparatus is a station of the wireless LAN.

5. The communication apparatus according to claim 1, wherein in a case where the communication apparatus manages the PMK corresponding to the other communication apparatus, the communication apparatus transmits, in the association processing, an association frame including the managed PMK ID, and the communication apparatus does not execute the authentication processing using the EAP with the other communication apparatus and the external authentication server.

6. The communication apparatus according to claim 1, wherein the communication apparatus further comprises a hardware module for executing a printing process, wherein the operations further comprises executing, via the first radio link and the second radio link, unicast communication for communicating document data encrypted by using the temporary key.

7. The communication apparatus according to claim 1, wherein the communication apparatus further comprises a hardware module for executing an image capturing process.

8. A control method executed by a communication apparatus capable of performing wireless communication compliant with IEEE 802.11 standard series, comprising:
   executing association processing in a first radio link in order to establish the first radio link and a second radio link with another communication apparatus;
   obtaining a Pairwise Master Key (PMK) by executing authentication processing using Extensible Authentication Protocol (EAP) with the other communication apparatus in the first radio link in which the association processing is executed and with an external authentication server which is different from the communication apparatus and the other communication apparatus, but not executing the authentication processing using the EAP in the second radio link;
   obtaining a temporary key generated based on the PMK, by executing a 4-way handshake (4WHS) processing with the other communication apparatus in the first radio link, wherein the temporary key is an encryption key to be used for unicast communication;
   executing, via the second radio link, unicast communication using the temporary key;
   performing management of the obtained PMK as a cache data, wherein, in the management, a PMK identifier (ID) and Multi Link Device identifier (MLD ID) are managed in relation to the obtained PMK as the cache data; and
   in a case where the communication apparatus manages the PMK corresponding to the other communication apparatus, transmitting, in the association processing, an association frame including the PMK ID to the other communication apparatus, notifying, in the association processing, the other communication apparatus of the PMK ID and the MLD ID information by including the PMK ID and the MLD ID in an association request.

9. A non-transitory computer-readable storage medium that stores a program for causing a computer, provided in a communication apparatus capable of performing wireless communication compliant with IEEE 802.11 standard series, to:

execute association processing in a first radio link in order to establish the first radio link and a second radio link with another communication apparatus;

obtain a Pairwise Master Key (PMK) by executing authentication processing using Extensible Authentication Protocol (EAP) with the other communication apparatus in the first radio link in which the association processing is executed and with an external authentication server which is different from the communication apparatus and the other communication apparatus, but not executing the authentication processing using the EAP in the second radio link;

obtain a temporary key generated based on the PMK, by executing a 4-way handshake (4WHS) processing with the other communication apparatus in the first radio link, wherein the temporary key is an encryption key to be used for unicast communication;

execute, via the second radio link, unicast communication using the temporary key;

perform management of the obtained PMK as a cache data, wherein, in the management, a PMK identifier (ID) and Multi Link Device (MLD) identifier (ID) are managed in relation to the obtained PMK as the cache data; and in a case where the communication apparatus manages the PMK corresponding to the other communication apparatus, transmitting, in the association processing, an association frame including the PMK ID to the other communication apparatus, notifying, in the association processing, the other communication apparatus of the PMK ID and the MLD ID information by including the PMK ID and the MLD ID in an association request.

* * * * *